No. 665,501. Patented Jan. 8, 1901.
F. W. BECKERT.
TUCK MARKER FOR SEWING MACHINES.
(Application filed May 26, 1900.)
(No Model.)
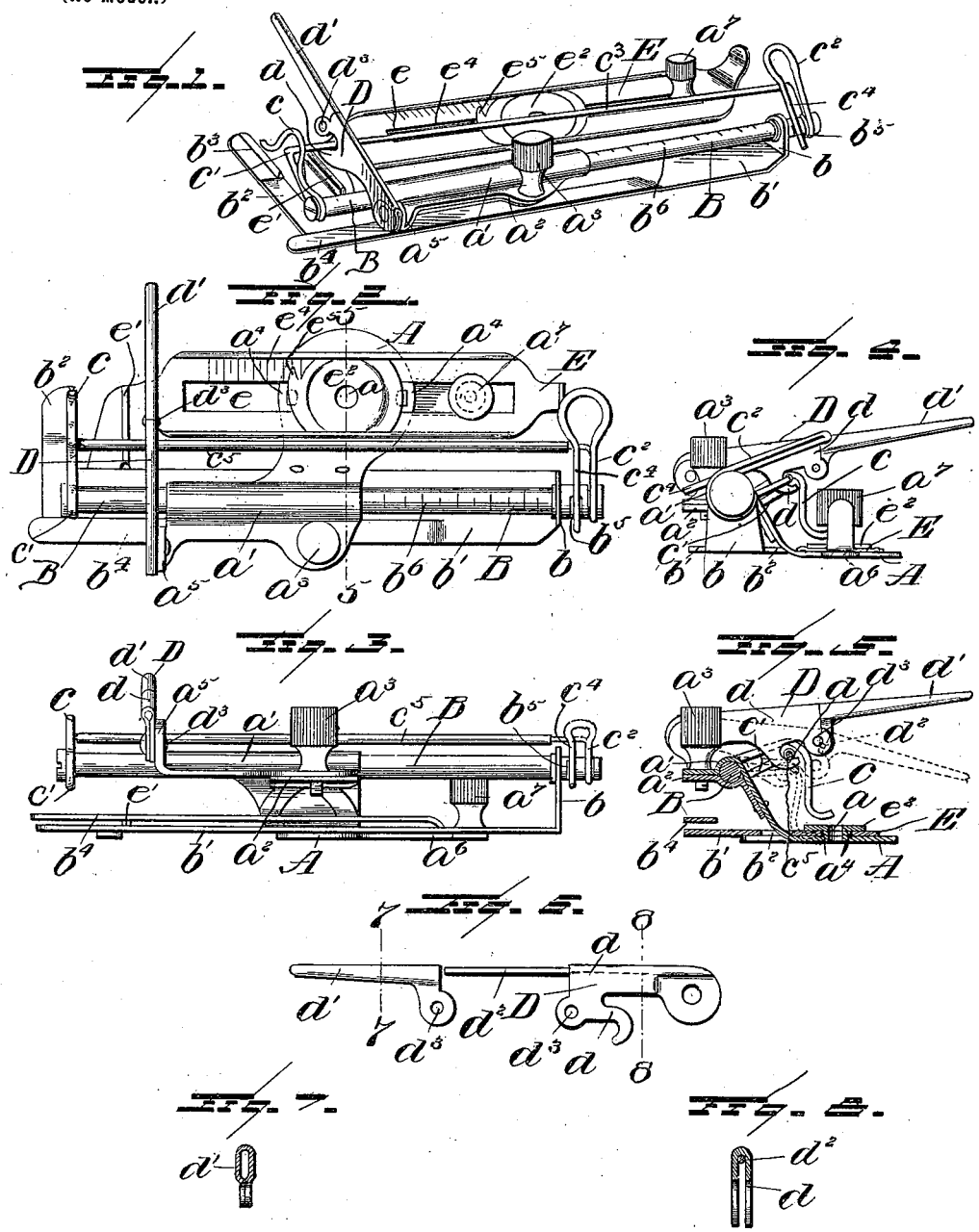
WITNESSES:
INVENTOR:
Frederick W. Beckert,
BY
Attorney.

UNITED STATES PATENT OFFICE.

FREDERICK W. BECKERT, OF NEW HAVEN, CONNECTICUT, ASSIGNOR TO THE GREIST MANUFACTURING COMPANY, OF CONNECTICUT.

TUCK-MARKER FOR SEWING-MACHINES.

SPECIFICATION forming part of Letters Patent No. 665,501, dated January 8, 1901.

Application filed May 26, 1900. Serial No. 18,061. (No model.)

*To all whom it may concern:*

Be it known that I, FREDERICK W. BECKERT, a citizen of the United States, residing at New Haven, in the county of New Haven and State of Connecticut, have invented certain new and useful Improvements in Tuck-Marking Attachments for Sewing-Machines, of which the following is a specification, reference being had therein to the accompanying drawings.

This invention relates to that class of sewing-machine tuck-marking or tuck-creasing attachments adapted to be secured to the work-plate of a sewing-machine and in which the creasing of the work is effected by a vibrating arm operated from the needle-bar of the machine in coöperation with a lip or projection upon which the work rests, the invention having for its object to provide a creasing attachment of the class referred to which will be simple in construction and efficient in operation.

In the accompanying drawings, Figure 1 is a perspective view of my improved creaser or marker. Fig. 2 is a plan view, and Fig. 3 a front side view, thereof. Fig. 4 is an end view looking from the right of Fig. 2. Fig. 5 is a cross-section on line 5 5 of Fig. 2 looking in the direction denoted by the arrows adjacent to said line. Fig. 6 is a detail view of the operating-lever with the parts thereof detached. Figs. 7 and 8 are cross-sections of the same on lines 7 7 and 8 8, respectively, of Fig. 7.

A denotes the base-plate or support of the attachment, said plate having a hole $a$, by which it may be secured to the work-plate of a sewing-machine by a suitable set-screw. The plate A is provided with a split sleeve $a'$, the upper portion of which is formed integral with said plate and the lower portion of which is formed by a plate $a^2$, riveted to the plate A, the said sleeve being raised somewhat above the bed or lower portion of the plate A.

B is a rod which is adjustably supported in the split sleeve $a'$ and which is clamped in any desired position of adjustment by means of a set-screw $a^3$, passing through ears with which the said split sleeve is provided. To the rear end of the rod B is rigidly secured, by means of an upturned portion or ear $b$, a longitudinally-extending plate $b'$, having at its forward end an arm $b^2$, provided with a creasing-lip $b^3$, and preferably formed integral with the said plate $b'$ is a work-holding spring $b^4$, the said parts B, $b$, $b'$, and $b^2$ constituting the creasing-frame. The vibrating creasing-arm $c$ is or may be formed as a portion of a bent wire comprising looped arms $c'$ and $c^2$, encircling the opposite end portions of the rod B, the rod $c^3$, joining the said looped arms, and an arm $c^4$, bent over and let into a notch or recess $b^5$ in an enlarged part at the rear end of the rod B. The vibrating creasing-arm $c$ (the lower end of which is notched or grooved, as usual, to coöperate with the upturned creasing-lip $b^3$) is pivoted on the rod B by means of the connected looped arms $c'$ and $c^2$, and the said creasing-arm is lifted after being depressed and is normally retained in a raised position by means of the arm $c^4$, which serves as a lifting-spring, the entire piece of wire comprising the parts $c$, $c'$, $c^2$, $c^3$, and $c^4$ being of spring metal and constituting a vibrating or rocking creasing member. Instead of forming the parts $c'$ $c^2$ $c^3$ in one integral piece, as shown in Fig. 1, the looped arms $c'$ and $c^2$ may be joined by a connecting-sleeve $c^5$, as shown in Figs. 2, 3, and 5, and into which sleeve extensions from said looped arms are secured.

The rod B of the creasing-frame is adjustable through the sleeve $a'$ to locate the creasing devices nearer to or farther from the needle for varying the distance apart of the tucks, a graduated scale $b^6$ being preferably formed on the rod B and which, in conjunction with the end of the sleeve $a'$ adjacent to said scales, denotes the width apart of the tucks being formed.

The sleeve $a'$ is provided with a small standard $a^5$, on which is pivoted the operating-lever D, which rests upon the rod $c^3$, so as to depress the said rod when said lever is depressed, and thus force the creasing-arm $c$ down upon the work lying upon the creasing-lip $b^3$. The lever D is provided with a hook $d$, which engages the rod $c^3$ when the parts are lifted, and which hook thus limits the upward movement of said rod $c^3$ by its lifting-spring portion $c^4$, the said lever D being of course lifted by the rod $c^3$. The said operating-lever D is preferably formed in two pivotally-connected parts $d$ and $d'$, the part $d'$ being yieldingly mounted on the part $d$ by means of the spring-wire $d^2$, secured in the part $d$ and extending into the part $d'$, the said part $d'$ being pivoted at $d^3$ to the part $d$. Each portion of the lever D is preferably formed from a piece of sheet metal bent or folded upon itself to form an arm which is U-shaped in cross-section, and within which U-shaped arms the spring-wire $d^2$ is inclosed, the said wire being attached at one end to the portion $d$ of the said operating-lever. The outer or yielding portion $d'$ of the lever D will be arranged so as to be engaged by a screw or projection on the needle-bar of the machine, and owing to the fact that said portion $d'$ has a spring connection with the said portion $d$, so as to yield and continue its movement after the movement of the portion $d$ has been arrested, it will be understood that the pressure of the creasing-arm $c$ upon the work lying upon the creasing-lip $d^3$ will be cushioned or yieldingly imparted, so as to avoid such injury to the work as might occur by a positive action if no cushioning means were provided.

The base-plate A is provided with a raised rib $a^4$, which is received in a slot $e$ of an adjustable plate E, carrying at its forward end the edge-guide $e'$, the said plate E being overlaid by a small plate or washer $e^2$, which is attached to the base-plate A in any suitable manner, so as to secure the said plate E to the said base-plate. The plate A is provided with a laterally-extending arm $a^6$, having a set-screw $a^7$ passing through the slot $e$ of the plate E, and by which set-screw the said plate is secured in any desired position of adjustment, and the said plate is preferably provided with a graduated scale $e^4$, overlaid by an index-finger $e^5$, formed on the plate or washer $e^2$, said scale and index denoting the width of the tucks being formed.

Having thus described my invention, I claim and desire to secure by Letters Patent—

1. In a sewing-machine tuck creaser or marker, the combination with a vibrating creasing-arm and a lip or lower member coöperating therewith, of an operating-lever for said arm formed in two pivotally-connected parts one of which is yieldingly mounted on the other.

2. In a sewing-machine tuck creaser or marker, the combination with a lower creasing member or lip, of an upper vibrating or rocking creasing member formed as part of a wire frame comprising two connected looped arms and having a bearing on a stationary part of the attachment, and a lifting-spring formed integral with one of said looped arms, a creasing-frame on which said looped arms are pivotally mounted, and means for operating the said vibrating creasing member.

3. In a sewing-machine tuck creaser or marker, the combination with the base-plate A having the split sleeve $a'$, a set-screw for clamping the portions of said sleeve together, a creasing-frame adjustably supported by said sleeve and comprising the rod B and the plate $b'$ attached to said rod and provided with an arm or portion having a lower creasing member or lip, the upper vibrating or rocking creasing member comprising the parts $c$, $c'$, $c^2$, $c^3$ and $c^4$, and the lever D for operating said vibrating creasing member.

4. In a sewing-machine tuck creaser or marker, the combination with the base-plate A having the raised rib $a^4$, of the creasing-frame adjustably supported by said base-plate and provided with creasing devices, the plate E adjustably secured to the said plate A and having a slot $e$ embracing said rib, and the edge-guide $e'$ carried by the said plate E.

5. In a sewing-machine tuck creaser or marker, the combination with the base-plate A provided with a split sleeve $a'$, the raised rib $a^4$ and the arm or portion $a^6$, of a creasing-frame supported by said split sleeve, creasing devices carried by said frame, the plate E having the slot $e$ embracing said rib $a^4$, an edge-guide carried by said plate E, a plate or washer overlying the said plate E and attached to said base-plate A, and a set-screw tapped in said arm or portion $a^6$ and serving to secure the said plate E in any desired position of adjustment.

6. In a sewing-machine tuck creaser or marker, the combination with a vibrating creasing device and a lower lip coöperating therewith, of an operating-lever for said vibrating creasing device consisting of two parts $d$ and $d'$ pivotally connected, and each of which consists of a folded piece of sheet metal U-shaped in cross-section, and a spring-wire attached to the said part $d$ and extending into the said part $d'$ and serving to yieldingly mount the said part $d'$ upon said part $d$.

In testimony whereof I affix my signature in presence of two witnesses.

FREDERICK W. BECKERT.

Witnesses:
P. R. GREIST,
DAVID C. MONSON.